United States Patent [19]

Derozier

[11] 4,238,112
[45] Dec. 9, 1980

[54] SPOOL SPIN PREVENTION FOR HYDRAULIC CONTROL VALVES

[75] Inventor: Danny M. Derozier, Burlington, Wis.

[73] Assignee: Rexnord Inc., Milwaukee, Wis.

[21] Appl. No.: 972,198

[22] Filed: Dec. 22, 1978

[51] Int. Cl.³ .................................... F15B 13/044
[52] U.S. Cl. ................. 251/324; 137/625.65; 137/625.69
[58] Field of Search ............ 137/625.65, 625.69; 251/324

[56] References Cited

U.S. PATENT DOCUMENTS

| | | | |
|---|---|---|---|
| 3,771,564 | 11/1973 | Bianchetta et al. | 137/596.13 X |
| 4,133,510 | 1/1979 | Lorimor | 137/596.13 X |

FOREIGN PATENT DOCUMENTS

| | | | |
|---|---|---|---|
| 2361591 | 6/1975 | Fed. Rep. of Germany | 137/625.65 |
| 71888 | 2/1960 | France | 251/324 |
| 318731 | 3/1972 | U.S.S.R. | 137/625.62 |

Primary Examiner—Gerald A. Michalsky
Attorney, Agent, or Firm—Aaron L. Hardt

[57] ABSTRACT

An improved hydraulic control valve having means for preventing rotational spinning of the spool caused by flow within the valve that impinges on the outer surfaces of the spool. A washer having a tang that abuts the valve body to prevent rotation is mounted on the flattened surface of a stem extending from the spool fixing the washer and spool against relative rotation but allowing axial displacements therebetween. A second embodiment provides a pin, one end of which extends through an eccentric hole in a washer similarly mounted on the valve stems but lacking the tang. The pin is fixed at one end to a non-rotating member or to the valve body. An alternate configuration has a rectangular slot formed in the valve stem parallel to its longitudinal axis, into which slot a diametrically disposed pin mounted at each end in a non-rotating part is fitted to prevent spool rotation.

3 Claims, 4 Drawing Figures

SPOOL SPIN PREVENTION FOR HYDRAULIC CONTROL VALVES

BACKGROUND OF THE INVENTION

1. Field of the Invention

This invention relates to hydraulic control valves and more particularly to an improvement in spool control valves whereby the spool is fixed against spinning about its axis.

2. Description of the Prior Art

It is well known that the spool of a hydraulic control valve rotates within the valve body at enormous speeds produced by flow patterns that are directed tangential to the outer spool surfaces. It has been determined that the spool of a ¼ inch valve can spin at approximately 2200–2500 revolutions per minute due to this phenomena. Generally the spool is supported within the valve on lands formed at spaced intervals on the inner surface of the valve body that provide cylindrical surfaces upon which mating spool surfaces fit. Usually a thin film of hydraulic oil occupies the space between the spool surface and the valve lands, but as spool spin attains high speed the oil film is dispersed, the spool wobbles in addition to spinning, and the mating support surfaces wear. This wear accrues at extraordinary rates: an ⅛ inch valve was found to have had the contacting spool-valve surface worn beyond tolerable limits in six hours.

This problem inherent in spool control valves has typically been accommodated by manufacturers by specifying a reduced flow rate for the valves when operating to deenergize the hydraulic system since spool spin can be reduced or eliminated as flow rates through the valve are minimized. In actual practice the specified flow rate for draining or deenergizing a system is substantially less than the flow rate capacity such valves would have if spool spin could be eliminated.

SUMMARY OF THE INVENTION

An improved hydraulic control valve according to this invention has means for preventing rotational spinning of the spool caused by flow within the valve that impinges on the outer surfaces of the spool. A washer having a tang that abuts the valve body to prevent rotation is mounted on the flattened surface of a stem extending from the spool fixing the washer and spool against relative rotation but allowing axial displacements therebetween. A second embodiment provides a pin, one end of which extends through an eccentric hole in a washer similarly mounted on the valve stem but lacking the tang. The pin is fixed at one end to a non-rotating member or to the valve body. An alternate configuration has a rectangular slot formed in the valve stem parallel to its longitudinal axis, into which slot a diametrically disposed pin mounted at each end in a non-rotating part is fitted to prevent spool rotation.

Among the several objects of the present invention may be noted provision of a hydraulic control valve having a spool capable of the axial translation required to change flow within the valve, but prevented from rotation about its axis.

DESCRIPTION OF THE PREFERRED EMBODIMENTS

Figure 1:
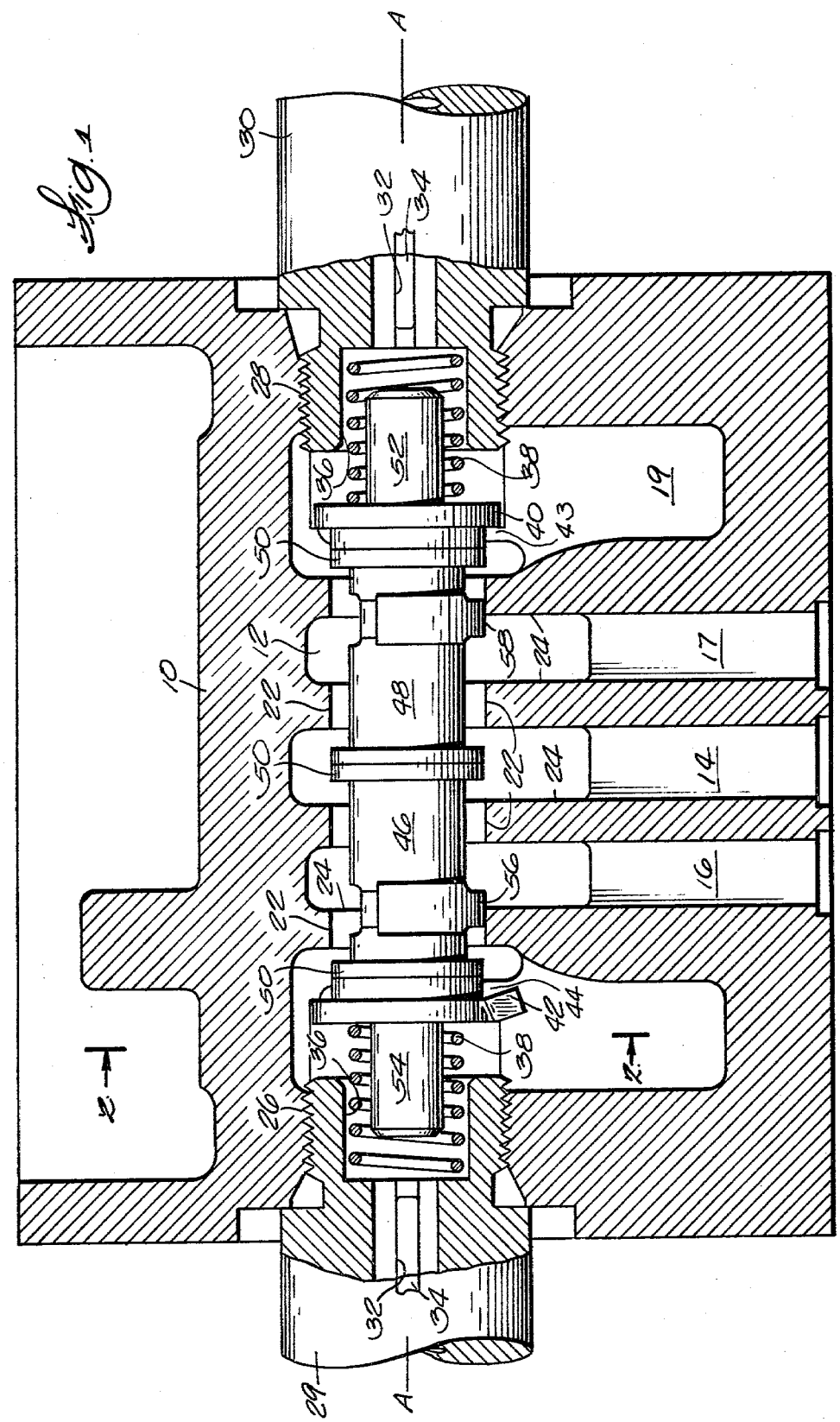
FIG. 1 is an elevation cross-section of a control valve taken at the longitudinal axis of the valve spool.

Turning now to a more specific description of this invention, three embodiments are described, the first of them illustrated in FIG. 1. A valve body 10 has a central, generally cylindrical chamber 12, formed along a longitudinal axis A—A and at least one inlet port 14 into which hydraulic fluid at elevated system pressure is supplied. Port 14 communicates with chamber 12 allowing hydraulic fluid to exit the valve through cylinder port 16, 17 and tank ports 18, 19 by flowing axially within chamber 12 from its junction with port 14.

Chamber 12 consists of a cylindrical bore machined axially through the valve body 10, which is generally of cast material. The bore forms local lands 22 at spaced intervals along the valve axis, between which are situated cylindrical core spaces 24 that comprise terminal zones for the various ports 14, 16, 17, 18, 19 that intersect chamber 12.

At axially opposite ends of chamber 12 are provided threads 26, 28 into which guide tubes 29, 30 are threaded. Each guide tube has a central, axially-directed bore 32 in which a push pin 34 is caused to move when a solenoid mounted on each guide tube is actuated. A larger recess 36 formed at the innermost end of the tubes 29, 30 accepts a spring 38 preloaded in compression to bias a conventional washer 40 and an anti-rotation washer 42 into contact with stops 43 and 44, respectively formed on the inner surface of the valve body.

A valve spool 46 is located within chamber 12, aligned with axis A—A and provides control of hydraulic fluid flow between inlet port 14 and the exit ports. The spool can be of any configuration required to accomplish functional objectives of the valve in respect of closing various port from access to system fluid and opening other ports, but such action results generally from axial displacement of the spool from a neutral center position, shown in FIG. 1. Generally the spool comprises a cylindrical body portion 48, local cylindrical piston portions 50 having an outer diameter larger than the body portion but approximately equal the diameter of the lands 22, stem portions, 52, 54 extending outwardly from the spool at opposite ends, and guide surfaces 56, 58 having the same diameter as the piston portions but formed as the residual peripheral surfaces remaining after machining non-intersecting circular segments from the face and through the thickness of what would otherwise be addition piston portions. In this way the lands 22 can be seen to provide surfaces upon which the spool is supported at the guide surfaces and piston portions. On assembly, washers 40, 42 are located over stem portions 52, 54, respectively. Washer 40 is a circular disc washer having a central circular hole capable of fitting over the stem 52 but providing diametric clearance enough to allow axial displacement of the spool relative to the washer.

Figure 2:
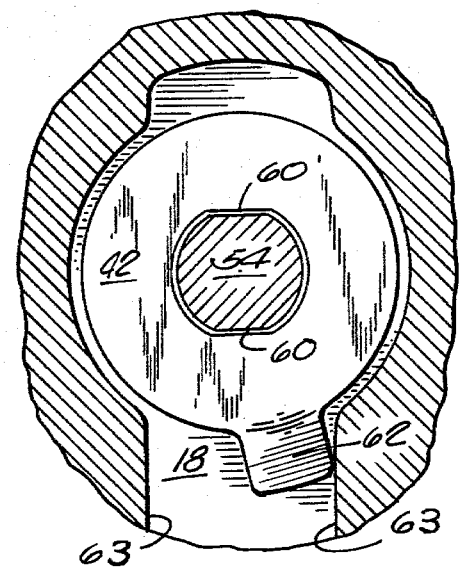
FIG. 2 is a cross-section taken at plane 2—2 of FIG. 1.

FIG. 2 shows the opposite spool end having a stem 54 with planar flats 60 formed thereon to fit within a similarly shaped central hole in washer 42. A tang 62 extends radially from the circular disk washer 42 a sufficient length to contact the surfaces 63 of the tank port 18 and in this way prevents rotation of washer 42 and the spool to which it is keyed. Tang 62 is preferably formed at a slight angle to the plane of the washer 42 so that the washer 42 contacts the face of the guide tube 29 in its annular region.

When pressurized fluid enters inlet port 14 and flows in chamber 12 to either exit cylinder ports 16, 17 or to tank ports 18, 19 the spinning action of the spool on the lands 22 is prevented by the washer tang bearing on the walls of tank port 18. Axial motion of the spool results in response to actuated solenoids causing push pins 34 to apply axial force to the outer face of stems 52, 54.

Figure 3:
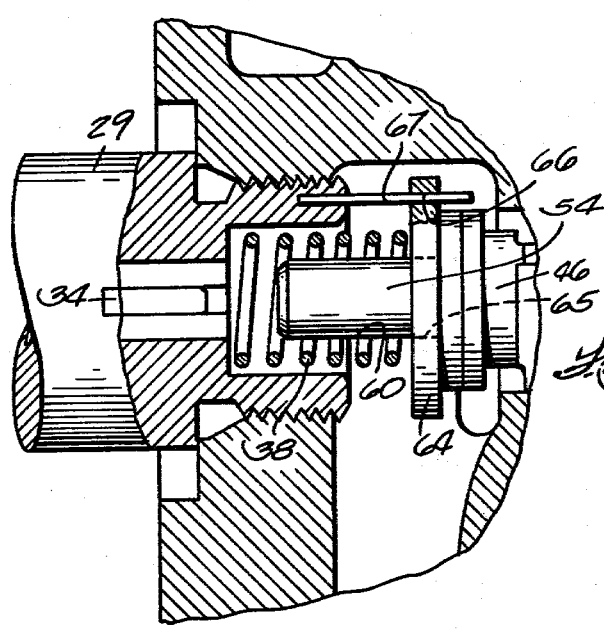
FIG. 3 is an elevation cross-section of a control valve taken through the longitudinal axis of the spool of a second embodiment.

A second embodiment, shown in FIG. 3, likewise provides rotational restraint, to the spool 46, but allows the requisite axial spool motion. In this case washer 42 is replaced by a washer 64 having a central non-circular hole 65 that keys the washer to the stem 54 by way of flats 60 formed on the surface of the stem and in the hole 65 and an eccentric circular hole 66 formed through the washer thickness. A pin 67 retained fixed at one end in guide tube 29 extends therefrom into hole 66. When push pin 34 applies axial force to move the spool 46 in response to being actuated by a solenoid or by mechanical means, the spool will slide in chamber 12 as previously described but is restrained against rotation by being keyed to washer 64, which is restrained from turning by pin 67.

Figure 4:
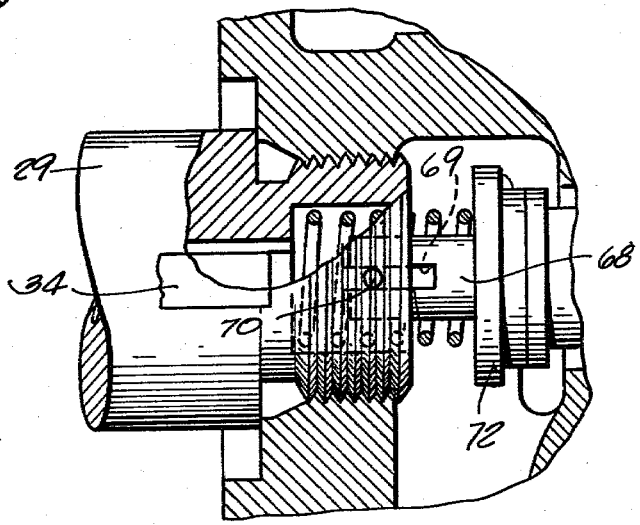
FIG. 4 is a cross-section through the longitudinal axis of the spool of a third embodiment.

FIG. 4 illustrates an alternate configuration wherein stem 68 having a circular cylindrical shape has a slot 69 into which is fit a rod 70 that is retained at its ends in the guide tube 29. Stem 68 and washer 72 are without the flats previously described since the spool is keyed against rotation directly to rod 70. Push pin 34 abuts the outer face of stem 68 to move spool 46 axially but over a larger area than FIG. 1 and 3 so contact is certain to result.

Although the invention has been described with respect to preferred embodiments, it will be appreciated that various changes and modifications may be made therein without departing from the spirit and scope of the invention, and thus it is not intended to limit the invention except by the terms of the following claims.

I claim:

1. A hydraulic control valve comprising:
   a valve body having a central chamber and at least one inlet or outlet port through which hydraulic fluid may enter and exit said chamber,
   a valve spool located within said chamber for opening and closing access between said ports and said chamber; and
   a washer keyed to said valve spool by the mating contact of a first planar surface on said valve spool and a second planar surface on said washer to prevent the relative rotation of said washer and valve spool, said washer having a surface extending therefrom and contacting said valve body eccentric to the axis of said valve spool to prevent relative rotation of said washer to said valve body,
   whereby the prevention of said relative rotations of said washer and valve spool and said washer and valve body prevents the rotation of said valve spool about its longitudinal axis relative to said valve body, but allows relative axial displacement between said valve spool and said valve body.

2. The hydraulic control valve according to claim 1, wherein said valve spool provides a stem portion having thereon said first planar surface positioned eccentric the longitudinal axis of said spool and wherein said washer includes a hole into which is fit said spool stem portion, said hole providing said second planar surface for engaging said first planar surface therby prventing relative rotation but allowing relative axial displacement between said valve spool and said washer.

3. The hydraulic control valve according to claim 2, wherein said surface extending from said washer fits within an inlet or outlet port and contacts said valve body on the wall of the port.

* * * * *